UNITED STATES PATENT OFFICE.

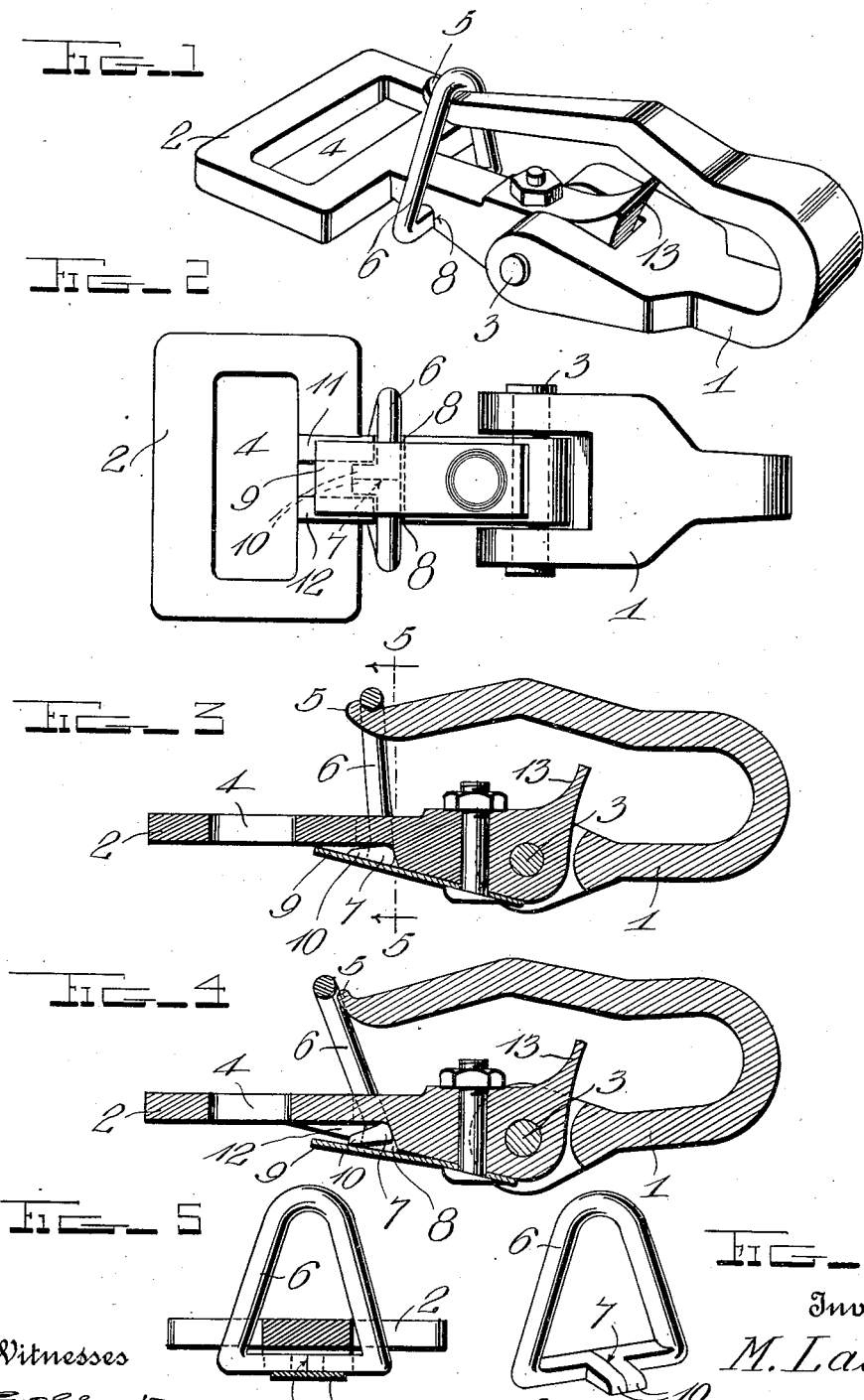

MARTIN LAU, OF WALNUT GROVE, MINNESOTA.

SNAP-HOOK.

1,007,213.  Specification of Letters Patent.  Patented Oct. 31, 1911.

Application filed May 4, 1911.  Serial No. 625,048.

*To all whom it may concern.*

Be it known that I, MARTIN LAU, a citizen of the United States, residing at Walnut Grove, in the county of Redwood and State of Minnesota, have invented certain new and useful Improvements in Snap-Hooks; and I do declare the following to be a full, clear, and exact description of the invention, such as will enable others skilled in the art to which it appertains to make and use the same.

The invention relates to improvements in snap hooks.

The object of the invention is to provide a simply constructed, strong, and efficient device of this character in which the parts thereof may be readily removed and replaced when broken and having means which reliably holds the bill of the hook in closed position.

Another object of the invention is to provide a device of this character which may be readily opened and closed and which is practically unbreakable in view of the fact that the line of draft is exerted at the strongest portion of the hook.

With these and other objects in view, the invention consists of certain novel features of construction, and the combination and arrangement of parts as will be more fully described and claimed.

In the accompanying drawings:—Figure 1 is a perspective view of this improved hook in operative position; Fig. 2 is a bottom plan view thereof; Fig. 3, is a central vertical longitudinal section view with the parts in operative or closed position; Fig. 4 is a similar view showing the catch member in the position which it assumes when the bill is being closed just before the nose thereof is forced under said catch; Fig. 5 is a transverse section taken on the line 5—5 of Fig. 3 and looking in the direction of the arrow; Fig. 6 is a detail perspective view of the catch.

In the embodiment illustrated, the body 1 of the hook is formed from a heavy flat strip of metal having one end bifurcated to which a T-shaped strap attaching member 2 is pivotally connected, the free end of the stem of said member 2 being inserted between the ends of the bifurcated arms of the member 1 and pivotally connected therewith by means of a pivot pin 3 which extends through registering eyes or apertures in said arms and stem. The head of said T-shaped member 2 is slotted longitudinally as shown at 4 to receive the strap to which it is adapted to be attached. The free end or bill of the body member 1 is preferably tapered and has an upturned nose 5 at the extremity thereof for engagement with a catch member 6 pivotally mounted on the shank or stem of the member 2 in the manner hereinafter described. This catch member 6 is preferably V-shaped or triangularly shaped as is shown clearly in Fig. 4 with the apex or one corner thereof arranged to engage the hooked nose 5 of the bill of the hook. The bottom or stem engaging portion of the member 6 is preferably split as shown at 7 to provide for the ready removal and insertion of the catch when desired. This split portion of the member 6 is mounted in a recess or groove 8 which extends transversely across the lower face of the stem of the member 2 and is yieldably held within said groove by a spring tongue 9 secured at one end to the lower face of the stem of the member 2 with its free end overlapping the stem engaging portion of the catch 6. This split bottom portion of the catch 6 is preferably provided with lugs, as 10, which are adapted to extend between longitudinally arranged laterally spaced ribs 11 and 12 formed on the lower face of the stem of the member 2 in advance of the groove 8 therein, said lugs when so engaged being designed to hold the member 6 against transverse movement and which are also designed to engage the spring tongue 9 and force it outwardly when the catch is turned back to disengage it from the bill of the hook.

Projecting from the upper face of the stem or shank of the member 2 near its pivoted end is an upturned lug 13 which is designed to prevent the strap or ring engaged by the hook from slipping out longitudinally and thereby being accidentally disengaged.

In the operation of this improved snap hook, the slotted head of the member 2 is engaged with a strap (not shown) and to disengage the nose 5 of the hook bill from the catch, it is only necessary to turn the catch outwardly against the tension of the spring 7 and the weight of the body 1 of the hook will cause it to swing downwardly into open position. After the bill of the hook has been engaged with the ring or other object to which it is desired to attach it, said body portion is swung upwardly on the pivot pin 3 and the nose 5 thereof again coming in contact with the catch 6 will force said catch again outwardly and the spring tongue 9 will return said catch automatically into engagement with said hooked nose and the hook will be securely held thereby in operative position. The outer face of this hooked nose is preferably beveled as shown to permit it to slidably engage the catch 6 and force it outwardly when the body 1 is moved upwardly into closed position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

I claim as my invention:—

1. A snap hook comprising a strap-engaging member having a shank with a lateral projection at its free end, a bill-carrying member having its free end bifurcated with the arms thereof straddling the free end of the shank of the engaging member and pivoted thereto, said lateral projection on said shank extending transversely of said bill to prevent the article engaged by said bill from becoming accidentally disengaged therefrom, and a pivotally mounted resiliently supported catch extending laterally from said shank and into the path of said bill.

2. A snap hook comprising a strap engaging member having a shank, a bill carrying member pivotally connected with the free end of said shank, a groove extending transversely across the lower face of said shank, a triangular catch member having one side mounted in said groove with the apex thereof projecting into the path of said bill, and a plate spring secured to said shank and extending across the groove and the catch mounted therein and bearing on said catch to yieldably hold it in operative position.

In testimony whereof I have hereunto set my hand in presence of two subscribing witnesses.

MARTIN LAU.

Witnesses:
C. A. ZIESKE,
J. A. SWERTSON.

Copies of this patent may be obtained for five cents each, by addressing the "Commissioner of Patents, Washington, D. C."